United States Patent
Sakai et al.

(10) Patent No.: US 10,683,374 B2
(45) Date of Patent: Jun. 16, 2020

(54) SOLID MAO COMPOSITION CONTAINING $AL_2O_3$ AND METHOD FOR PRODUCING SAME

(71) Applicant: Tosoh Finechem Corporation, Shunan-shi, Yamaguchi (JP)

(72) Inventors: Kentaro Sakai, Miyazaki (JP); Yujin Takemoto, Shunan (JP); Eiichi Kaji, Shunan (JP)

(73) Assignee: Tosoh Finechem Corporation, Shunan-Shi, Yamaguchi (JP)

( * ) Notice: Subject to any disclaimer, the term of this patent is extended or adjusted under 35 U.S.C. 154(b) by 63 days.

(21) Appl. No.: 15/778,868

(22) PCT Filed: Nov. 22, 2016

(86) PCT No.: PCT/JP2016/084544
§ 371 (c)(1),
(2) Date: May 24, 2018

(87) PCT Pub. No.: WO2017/090585
PCT Pub. Date: Jun. 1, 2017

(65) Prior Publication Data
US 2018/0355077 A1  Dec. 13, 2018

(30) Foreign Application Priority Data
Nov. 26, 2015 (JP) ................ 2015-230487

(51) Int. Cl.
*C08F 4/02* (2006.01)
*C08F 4/6592* (2006.01)
*C08F 10/02* (2006.01)
*C08F 110/02* (2006.01)
*C08F 4/659* (2006.01)

(52) U.S. Cl.
CPC .............. *C08F 10/02* (2013.01); *C08F 4/025* (2013.01); *C08F 4/027* (2013.01); *C08F 110/02* (2013.01); *C08F 4/65912* (2013.01)

(58) Field of Classification Search
CPC ........ C08F 4/02; C08F 4/025; C08F 4/65912; C08F 4/65916
See application file for complete search history.

(56) References Cited

U.S. PATENT DOCUMENTS

| 4,101,615 | A | 7/1978 | Horikiri et al. |
| 5,157,008 | A | 10/1992 | Sangokoya et al. |
| 2011/0282017 | A1 | 11/2011 | Kaji et al. |
| 2013/0059990 | A1 | 3/2013 | Kaji et al. |

FOREIGN PATENT DOCUMENTS

| JP | 2001502714 A | 2/2001 |
| WO | 9818801 A1 | 5/1998 |
| WO | 2010055652 A1 | 5/2010 |
| WO | 2013146337 A1 | 10/2013 |

OTHER PUBLICATIONS

Written Opinion of the Int'l Searching Authority dated Jan. 10, 2017 in Int'l Application No. PCT/JP2016/084544.
Int'l Preliminary Report on Patentability dated May 29, 2018 in Int'l Application No. PCT/JP2016084544.
Extended European Search Report dated Sep. 6, 2019 in EP Application No. 16868532.9.
Office Action dated Mar. 17, 2020 in IN Application No. 201847023125.

*Primary Examiner* — Caixia Lu
(74) *Attorney, Agent, or Firm* — Panitch Schwarze Belisario & Nadel LLP (57) ABSTRACT

Provided is a solid polymethylaluminoxane composition which has higher activity when being used as a co-catalyst in olefin polymerization. The solid polymethylaluminoxane composition contains polymethylaluminoxane, trimethylaluminum, and $Al_2O_3$, wherein: (i) the aluminum content is in a range of 36-43 mass %; and (ii) the $Al_2O_3$ content is in a range of 0.001-10 mol % represented in terms of aluminum.

13 Claims, 5 Drawing Sheets

SOLID MAO COMPOSITION CONTAINING AL₂O₃ AND METHOD FOR PRODUCING SAME

CROSS-REFERENCE TO RELATED APPLICATION

This application is a Section 371 of International Application No. PCT/JP2016/084544, filed Nov. 22, 2016, which was published in the Japanese language on Jun. 1, 2017 under International Publication No. WO 2017/090585 A1, the disclosure of which is incorporated herein by reference in its entirety.

The present invention relates to a solid polymethylaluminoxane composition (hereinafter may be referred to solid MAO composition), a polymerization catalyst employing the solid MAO composition as a catalytic component, and a method for producing polyolefins.

BACKGROUND ART

Solution polyaluminoxane compositions are condensation products generally prepared by the partial hydrolysis of an organic aluminum compound. They are known to be useful as co-catalysts that efficiently activate the transition metal compounds serving as primary catalysts in the producing of olefin polymers. Polymethylaluminoxane compositions in which trimethylaluminum is employed as a starting material organic aluminum compound are widely known to perform particularly well as co-catalysts. These compositions are normally handled in the form of solutions obtained by dissolution in aromatic hydrocarbon solvents such as toluene.

Polymethylaluminoxane compositions perform well as co-catalysts. However, they are normally handled in a state where a primary catalyst such as a metallocene compound and polymethylaluminoxane composition have been dissolved in a solvent. Thus, the morphology of the polymer that is produced cannot be controlled. Not only does handling of the polymer present problems, but there is also a drawback in that fouling due to adhesion of the polymer to the polymerization reactor or the like occurs quite readily. To solve these problems, a method of preparing a supported solid polymethylaluminoxane composition—consisting of a polymethylaluminoxane composition supported on a solid inorganic support such as silica, alumina, or magnesium chloride—applying the same to slurry polymerization or gas phase polymerization has been proposed. Silica of which surface hydroxyl group amount is controlled is the most widely employed support among solid inorganic supports, and there are a number of examples of its use at the industrial level. Use of a polymer support such as polystyrene beads is also proposed.

The above silica support is known to deteriorate the performance of polymers by tending to remain on the polymer, being a cause of fish-eyes in forming a film, and the like. Solid polymethylaluminoxane compositions in which such supports have been employed are known to exhibit a greater drop in activity than in the polymerization activity in homogeneous polymerization. Accordingly, to solve these problems, to reduce the negative impact of the support on the polymer while retaining the merits of a promoter in the form of a polymethylaluminoxane composition in a solid state, there is a need to develop a solid polymethylaluminoxane composition which is highly active as competitive to homogeneous polymerization.

We proposed a solid polymethylaluminoxane composition in the form of relatively fine particles with a volume-based median diameter in the range of 5 to 50 µm, and comprising solely a polymethylaluminoxane composition without any support such as silica, along with a method for efficiently preparing these (PTL 1). The resulting solid polymethylaluminoxane composition has a relatively uniform particle diameter, and the polymerization activity when preparing an olefinic polymer is higher than that of a solid polymethylaluminoxane composition using a support. Depending on the polymerization conditions, it may express activity comparable to that of a solution polymethylaluminoxane composition. That is, the solid polymethylaluminoxane is a novel solid co-catalyst that combines the properties of a strong co-catalyst (activator) with the function of a support. Moreover, we also proposed a solid polymethylaluminoxane composition having a volume-based median diameter of less than 5 µm that is smaller than that of the polymethylaluminoxane composition described in PTL 1, as well as a particle size distribution with high homogeneity and strong polymerization activity when preparing an olefinic polymer, and reactor fouling suppression ability, along with a method for manufacturing the composition (PTL 2).

With the methods described in PTL 1 and 2 above, it is possible to provide methods that are highly efficient for preparing a solid polymethylaluminoxane composition from a solution polymethylaluminoxane composition, and do not require the solvent to be removed with a vacuum pump from the solution polymethylaluminoxane composition.

Patent Literature 1 (PLT1): WO2010/055652
Patent Literature 2 (PLT2): WO2013/146337

The entire contents of Patent Literatures 1 and 2 are incorporated herein particularly by reference.

SUMMARY OF THE INVENTION

Problem to be Solved by the Invention

With the methods described in PTL 1 and 2, a solid polymethylaluminoxane that is more active than a silica supported polymethylaluminoxane composition can be obtained as discussed above. However, a polyolefin formed by olefin polymerization using a catalyst prepared using a solid polymethylaluminoxane produced by the methods described in PTL 1 and 2 (supporting a homogenous catalyst such as a metallocene complex) may have problems of poor morphology and reduced polymer bulk density, and there has been need for improvement in some cases.

Solution to Problem

The inventors have conducted various researches aimed at solving these problems. In the course of these, we discovered that when preparing a solid polymethylaluminoxane composition from a solution polymethylaluminoxane composition, the solution polymethylaluminoxane composition has been heated in the past at a temperature and for a time sufficient to prepare (precipitate) the solid polymethylaluminoxane composition, but if the heating temperature and time are changed to conditions outside the range described in PTL 1 and 2, regions containing $Al_2O_3$ exist in the resulting solid polymethylaluminoxane, and a solid polymethylaluminoxane containing $Al_2O_3$ has stronger activity as a co-catalyst for olefin polymerization than the solid polymethylaluminoxanes described in the examples of PTL 1 and 2. The inventors then perfected the present invention by pursuing this research.

In PTL 1 and 2, as described for example in claim 10 of PTL 1 and claim 9 of PTL 2, when heating the solution polymethylaluminoxane composition to obtain the solid polymethylaluminoxane composition, a heating temperature and heating time suited to precipitating the solid polymethylaluminoxane composition are selected. For example, the solid heating temperature and heating time in Example 1 of PTL 1 are 100° C. and 8 hours, respectively, and the heating temperature and heating time in Example 1 of PTL 2 are also 100° C. and 8 hours, respectively. However, it has become clear that the activity as a co-catalyst in olefin polymerization can be raised by about 5% by changing the conditions in Example 1 of PTL 1 to 100° C. and 16 hours. Furthermore, the precipitation rate is 97% with a heating time of 8 hours but 100% with a heating time of 16 hours, and structural analysis (TEM observation) of a solid polymethylaluminoxane composition precipitate obtained with a heating time of hours revealed the presence of crystalline $Al_2O_3$ in the solid polymethylaluminoxane. Further research based on this finding revealed a close association between the increase in crystalline $Al_2O_3$ in the solid polymethylaluminoxane composition and the morphology and polymer bulk density of a polyolefin formed by olefin polymerization. Moreover, we discovered that the amount of crystalline $Al_2O_3$ increases during heating after completion of precipitation of a solid polymethylaluminoxane composition. That is, we discovered for the first time that the morphology and polymer bulk density of a polyolefin formed by olefin polymerization are improved by heating after precipitation of a solid polymethylaluminoxane composition, thereby perfecting the present invention.

The solution polymethylaluminoxane that we use as a preparatory raw material for the solid polymethylaluminoxane composition has been completely dissolved in toluene, and consequently it is believed that the $Al_2O_3$ contained in the solid polymethylaluminoxane composition has been formed during preparation of the solid polymethylaluminoxane.

To solve the aforementioned problems, the present invention is as follows.

[1] A solid polymethylaluminoxane composition comprising polymethylaluminoxane, trimethylaluminum and $Al_2O_3$, wherein (i) the aluminum content is in the range of 36 mass % to 43 mass %, and (ii) the $Al_2O_3$ content is in the range of 0.001 mol % to 10 mol % based on aluminum.

[2] The solid polymethylaluminoxane composition according to [1], wherein at least part of the $Al_2O_3$ exists in the solid polymethylaluminoxane composition in the form of crystal grains.

[3] The solid polymethylaluminoxane composition according to [2], wherein the crystal grains of the $Al_2O_3$ are in the range of 0.1 to 200 nm in size.

[4] The solid polymethylaluminoxane composition according to any one of [1] to [3], wherein at least part of the $Al_2O_3$ exists in amorphous form in the solid polymethylaluminoxane composition.

[5] The solid polymethylaluminoxane composition according to any one of [1] to [4], wherein the polymethylaluminoxane contains the unit denoted by general formula (I) below:

$$-[(Me)AlO]_n-\quad (1)$$

wherein, Me represents a methyl group and n denotes an integer from 10 to 50.

[6] The solid polymethylaluminoxane composition according to any one of [1] to [5], wherein Me(TMAL), the mole fraction of methyl groups derived from the trimethylaluminum, is equal to or less than 15 mol %.

[7] The solid polymethylaluminoxane composition according to any one of [1] to [6], which is particulate and has a volume-based median diameter of 1 to 50 m.

[8] The solid polymethylaluminoxane composition according to any one of [1] to [7], which contains no solid carrier, provided that the $Al_2O_3$ is excluded from the solid carrier.

[9] The solid polymethylaluminoxane composition according to any one of [1] to [8], which is solid state at least at temperatures of 30° C. or less.

[10] A method for manufacturing a solid polymethylaluminoxane composition comprising $Al_2O_3$, the method comprising:

a step (a) of heating an aromatic hydrocarbon solution containing trimethylaluminum and the polymethylaluminoxane containing the unit denoted by general formula (II) below (referred to hereinafter as the solution of polymethylaluminoxane composition) to cause solid polymethylaluminoxane composition containing trimethylaluminum and polymethylaluminoxane to precipitate; and a step (b) of heating a solution containing the solid polymethylaluminoxane composition precipitated in step (a) above at the same temperature or at a different temperature from that in step (a) to thereby precipitate $Al_2O_3$ in the solid polymethylaluminoxane composition:

$$-[(Me)AlO]_n-\quad (II)$$

wherein, n is an integer from 10 to 50.

[11] The manufacturing method according to [10], wherein a dry inert gas is bubbled through the solution polymethylaluminoxane composition prior to the step (a), and/or a dry inert gas is bubbled through the solution polymethylaluminoxane composition during at least part of the step (a).

[12] An olefin polymerization catalyst comprising the solid polymethylaluminoxane composition according to any one of [1] to [9] and a catalyst component in the form of the transition metal compounds denoted by general formula (IV) below:

$$MR^5R^6R^7R^8 \quad (IV)$$

wherein M denotes a transition metal element; $R^5$ and $R^6$ denote together an organic group comprising a cycloalkanedienyl skeleton, $R^7$, and $R^8$ denote together an organic group comprising a cycloalkanedienyl skeleton, or $R^7$ and $R^8$ independently denotes an organic group or atom selected from the group consisting of a hydrocarbon group with 1 to 20 carbon atoms, alkoxy group, aryloxy group, alkylsilyl group, amino group, imino group, hydrogen atom, and halogen atom; and the organic group comprising a cycloalkanedienyl skeleton may have alkyl group, alkoxy group, aryloxy group, alkylsilyl group, alkylamide group, alkylimide group, alkylamino group, alkylimino group, and/or halogen atom.

[13] A method for manufacturing a polyolefin, comprising polymerizing an olefin using the catalyst according to [12].

Advantageous Effects of Invention

According to the present invention, it is possible to obtain a solid polymethylaluminoxane composition having stronger activity even when used as a co-catalyst in olefin polymerization.

DESCRIPTION OF EMBODIMENTS

[Solid Polymethylaluminoxane Composition]

The solid MAO composition of the present invention comprises polymethylaluminoxane (hereunder sometimes called PMAO), trimethylaluminum (hereunder sometimes called TMAL) and $Al_2O_3$. Moreover (i) the aluminum content is in the range of 36 mass % to 43 mass %, and (ii) the $Al_2O_3$ content is in the range of 0.001 mol % to 10 mol % based on aluminum.

By way of example, the polymethylaluminoxane can be one containing the unit denoted by general formula (I) below -[(Me)AlO]$_n$— (I)

In the formula, Me donates a methyl group and n denotes an integer of from 10 to 50.

The phrase "containing the unit denoted by general formula (I) below" means that it contains polymethylaluminoxane in which n is a singular number (n denotes a specific integer) falling within the above range or multiple polymethylaluminoxanes in which n is of multiple types (n denotes multiple different integers). n being an integer of from 10 to 50 is based on that the n of the polymethylaluminoxane in the solution polymethylaluminoxane composition serving as the starting material of the solid MAO composition being from 10 to 50.

It is reported in some literatures that disproportionation of the polymethylaluminoxane chains in the solution polymethylaluminoxane composition, or of the polymethylaluminoxane chains and the trimethylaluminum, changes the length of the polymethylaluminoxane chains. When a disproportionation reaction occurs between polymethylaluminoxane chains, trimethylaluminum is produced. When a disproportionation reaction occurs between a polymethylaluminoxane chain and trimethylaluminum, trimethylaluminum is consumed. However, when the solid polymethylaluminoxane was subjected to $^1$H-NMR measurement using a $d_8$-THF solvent prior to solvent washing, no obvious change in trimethylaluminum content was observed. It appears from this that the n of the polymethylaluminoxane in the solid MAO composition corresponds roughly to the n of the solution polymethylaluminoxane used as a raw material. In the present invention, "polymethylaluminoxane" can be of a chain structure, cyclic structure, or branched structure so long as the above unit is contained.

When the polymethylaluminoxane is of a cyclic structure, the theoretical quantity of aluminum is about 46 to 47 mass %, and the theoretical quantity of aluminum in the trimethylaluminum is about 38 mass %. That is, in cases where the content of aluminum in the solid MAO composition exceeds 46 mass %, the solid MAO composition is presumed to be comprised of polymethylaluminoxane having a cyclic structure, with almost no trimethylaluminum present and with no impurities such as solvents being contained. When the polymethylaluminoxane assumes a linear structure, the theoretical content of aluminum changes with the number n in general formula (I), but is smaller than in the cyclic structure. Additionally, since polymethylaluminoxane of linear and branched structures may be contained in the solid MAO composition of the present invention in addition to polymethylaluminoxane of cyclic structure, and since impurities such as residual solvent are possibly contained in addition to trimethylaluminum, in the solid MAO composition of the present invention, the aluminum content falls within a range of from 36 mass % to 43 mass %, as indicated by (I). The lower the aluminum content, the greater the proportion of trimethylaluminum present. The higher the aluminum content, the smaller the proportion of trimethylaluminum present tends to be.

The solid MAO composition of the present invention contains $Al_2O_3$. Since the Al content in $Al_2O_3$ is roughly 52.9 mass % (with the remained being oxygen content), the Al content of the solid MAO composition tends to rise when the $Al_2O_3$ content is increased.

Since the aluminum content is in the range of 36 mass % to 43 mass %, the solid MAO composition can have the properties of favorable particle size homogeneity and sufficient strength so that it is not crushed due to cracks and the like. Conversely, it has been shown that if the aluminum content of the solid MAO composition of the present invention is less than 36 mass %, the composition does not dry properly and contains too many impurities such as solvent impurities. If the aluminum content exceeds 43 mass %, as discussed above, the composition is presumed to comprise polymethylaluminoxane with a primarily cyclic structure, without any trimethylaluminum or solvent impurities, which is different from the composition of the solid MAO composition of the present invention. From this perspective, the aluminum content is preferably equal to or more than 38 mass % and equal to or less than 43 mass %, or more preferably equal to or more than 40 mass % and equal to or less than 42 mass %, or still more preferably equal to or more than 40.5 mass % and equal to or less than 41.5 mass %.

The aluminum content of the solid MAO composition and solution polymethylaluminoxane composition prepared in the present invention can be determined, for example, by adding an excess quantity of disodium ethylenediaminetetraacetate to a solution obtained by hydrolysis with 0.5N sulfuric acid aqueous solution, employing dithizone as an indicator, and performing a back titration with zinc sulfate. When the concentration being measured is weak, measurement can be conducted by atomic absorption spectrometry.

The $Al_2O_3$ content specified in (ii) is in the range of 0.001 mol % to 10 mol % based on aluminum. If the $Al_2O_3$ content is at least a specific amount, the resulting solid MAO composition has stronger activity when used as a co-catalyst in olefin polymerization as discussed above. The $Al_2O_3$ content is preferably 0.01 mol % to 8 mol %, or more preferably 0.1 mol % to 7 mol %, or still more preferably 0.2 mol % to 6 mol %, or yet more preferably 0.5 mol % to 5 mol % based on aluminum.

The $Al_2O_3$ contained in the solid MAO composition of the present invention may have either a crystal structure or an amorphous structure. At least part of the $Al_2O_3$ contained in the solid MAO composition of the present invention exists as crystal grains in the solid MAO composition. At least part of the $Al_2O_3$ may also exist in the solid MAO composition in amorphous form.

The existence of $Al_2O_3$, in particular the existence of $Al_2O_3$ crystals in the solid MAO composition can be confirmed by simulation analysis of a lattice pattern obtained by TEM observation of the solid MAO composition. TEM observation is explained under the examples.

The size of the crystal grains of $Al_2O_3$ in the solid MAO composition can be confirmed by TEM observation, and is preferably on the order of nanometers. Specifically, it may be 0.1 to 200 nm, or preferably 0.1 to 100 nm, or more preferably 0.1 to 50 nm. It is thought that some of the $Al_2O_3$ also exists in the form of amorphous structures in the solid MAO composition.

The $Al_2O_3$ contained in the solid MAO composition of the present invention is produced in the solid MAO composition in the process of preparing the solid MAO composition. Because it is produced in the process of preparing the solid MAO composition, it may have a different structure, existence state and the like from $Al_2O_3$ that is added post-facto to a solid MAO composition containing no $Al_2O_3$. However, there is no means of specifying the structure, existence state and the like of the $Al_2O_3$ contained in the solid MAO composition of the present invention, and it is difficult to specify the detailed features such as structure and existence state as things. The method for preparing the solid MAO composition of the present invention is discussed below.

The solid MAO composition of the present invention contains polymethylaluminoxane (PMAO) and trimethylaluminum (TMAL). The TMAL contained in the polymethylaluminoxane composition of the present invention exists inherently as an unreacted raw material. The total molar number of methyl groups contained in the solid MAO composition of the present invention is the sum of the molar number of methyl groups derived from the trimethylaluminum (TMAL) and the molar number of methyl groups derived from the polymethylaluminoxane (PMAO). If the mole fraction of TMAL is expressed as Me(TMAL) and the mole fraction of PMAO as Me(PMAO), the total Me(TMAL)+Me(PMAO) is 100%. The mole fraction Me(TMAL) of methyl groups derived from the trimethylaluminum is not more than 15 mol % for example.

A low Me(TMAL) means that there are fewer methyl groups derived from TMAL segments in the polymethylaluminoxane composition, and more aluminum in the form of polymethylaluminoxane chains. When the Me(TMAL) is not more than 15 mol %, the resulting solid MAO composition has low solvent solubility, and is strong enough that the particles are not crushed by drying treatment. If the Me(TMAL) exceeds 15 mol %, on the other hand, solvent solubility increases, and the particles tend to be easily crushed.

In the solid methylaluminoxane composition of the present invention, the Me(TMAL) is preferably not more than 11 mol %. The lower limit of the Me(TMAL) may be 6 mol % or greater for example, or preferably 8 mol % or greater because it depends on the solution polymethylaluminoxane as the shape-controllable raw material of the solid MAO composition.

The mole fractions of the respective components of the polymethylaluminoxane composition can be determined from the area ratios attributable to each component in $^1$H-NMR measurement of the polymethylaluminoxane composition. Methods for determining the specific mole ratios Me(PMAO) and Me(TMAL) of the polymethylaluminoxane composition are explained in the examples.

The solid MAO composition of the present invention is also particulate, with a volume-based median diameter in the range of 1 μm to 50 μm for example. If the volume-based median diameter of the solid MAO composition of the present invention in particulate form is within this range, it is possible to maintain a favorable bulk density of polymer obtained by using the solid MAO composition and a transition metal compound, and to obtain an olefinic polymer in which micronized polymer formation is suppressed. The volume-based median diameter of the solid MAO composition may generally be about 5 to 200 μm from the standpoint of obtaining favorable powder properties such as bulk density of the resulting olefinic polymer. When homogeneity is taken into account, the volume-based median diameter of the solid MAO composition of the present invention is preferably 1 to 50 μm, or more preferably in the range of 2 to 40 μm, or still more preferably in the range of 5 to 40 μm.

The median diameter and particle size distribution of the solid MAO composition of the present invention can be determined by the laser diffraction/scattering method in a dry nitrogen atmosphere using a Malvern Instrument, Ltd. Mastersizer 2000 Hydro S. The specific methods are described in the examples.

The solid MAO composition of the present invention does not contain a solid support. However, the $Al_2O_3$ is not a solid support. The solid MAO composition of the present invention is not one in which a solid support such as silica has been included deliberately at least during the manufacturing process. Because the solid MAO composition of the present invention does not contain a support such as silica, it can avoid the drawbacks of solid MAO compositions containing supports such as silica.

The solid MAO composition of the present invention is solid state at normal temperatures (such as 30° C. or less), and is at least solid at temperatures of 30° C. or less. Solid here means a state in which there is effectively no fluidity.

[Method for Manufacturing Solid MAO Composition]

The method for manufacturing a solid MAO composition of the present invention comprises:

a step (a) of heating an aromatic hydrocarbon solution containing trimethylaluminum and the polymethylaluminoxane containing the unit denoted by general formula (II) below (referred to hereinafter as the solution of polymethylaluminoxane composition) to cause a solid MAO composition containing trimethylaluminum and polymethylaluminoxane to precipitate; and a step (b) of heating a solution containing the MAO composition precipitated in step (a) above at the same temperature or at a different temperature from that in step (a) to thereby precipitate $Al_2O_3$ in the MAO composition:

$$-[(Me)AlO]_n- \quad (II)$$

wherein, Me represents a methyl group and n is an integer from 10 to 50.

Including the unit denoted by general formula (II) means either including polymethylaluminoxane having an n value within the above range (in which n is a specific integer), or including multiple kinds of polymethylaluminoxane having n values within the above range (in which n is multiple different integers). The reason why n is an integer from 10 to 50 is that the degree of polymerization of aluminoxane based on the molecular weight determined from the freezing point depression in benzene is in the range of 10 to 50.

The solution polymethylaluminoxane composition that is employed as a starting material in the producing method of the present invention can be prepared, for example, by the method described in JP2000-505785 (WO97/23288). The method described in the Patent Reference is a method of preparing polymethylaluminoxane composition without hydrolysis of trimethylaluminum. Specifically, an alkyl aluminum compound having aluminum-oxygen-carbon bonds is thermally decomposed to obtain a solution polymethylaluminoxane composition.

Examples of aromatic hydrocarbons that can be employed in the solution polymethylaluminoxane composition are: benzene, toluene, ethylbenzene, propylbenzene, butylbenzene, xylene, chlorobenzene, and dichlorobenzene. There is no limitation to these examples; any aromatic hydrocarbon can be employed as the solvent for the solution polymethylaluminoxane composition.

Moreover, the alkyl aluminum compound having aluminum-oxygen-carbon bonds is desirably prepared by reacting trimethylaluminum and an oxygen-containing organic compound. The oxygen-containing organic compound is desirably an aliphatic or aromatic carboxylic acid denoted by general formula (III):

$$R^1\text{—(COOH)}_n \qquad \text{(III)}$$

In the formula, $R^1$ denotes a hydrocarbon group in the form of a C1 to C20 linear or branched alkyl group, alkenyl group, or aryl group and n denotes an integer of from 1 to 5.

The oxygen-containing compound that is employed in the reaction of an oxygen-containing compound and trimethylaluminum to obtain an alkyl aluminum compound having aluminum-oxygen-carbon bonds that yields a solution polymethylaluminoxane composition upon thermal decomposition is a carboxylic anhydride or carboxylic acid compound having a COOH group. When preparing the solution polymethylaluminoxane composition, one or more of these compounds can be employed. Specific examples of the oxygen-containing compound are formic acid, acetic acid, propionic acid, n-butyric acid, n-valeric acid, n-caproic acid, n-enanthic acid, n-caprylic acid, n-pelargonic acid, n-capric acid, n-lauric acid, n-myristic acid, n-stearic acid, oxalic acid, malonic acid, succinic acid, glutaric acid, adipic acid, pimelic acid, suberic acid, azelaic acid, sebacic acid, benzoic acid, phthalic acid, citric acid, tartaric acid, lactic acid, malic acid, toluic acid, toluic anhydride, acetic anhydride, propionic anhydride, n-butyric anhydride, n-valeric anhydride, n-caproic anhydride, oxalic anhydride, malonic anhydride, succinic anhydride, glutaric anhydride, benzoic anhydride, phthalic anhydride, and toluic anhydride. Of these, acetic acid, acetic anhydride, propionic acid, propionic anhydride, benzoic acid, benzoic anhydride, phthalic acid, phthalic anhydride, toluic acid, and toluic anhydride are desirable.

The molar ratio of the aluminum atoms contained in the trimethylaluminum and the oxygen atoms of the oxygen-containing organic compound employed in the synthesis of the solution polymethylaluminoxane composition can be set as desired to control the molecular weight of the polymethylaluminoxane or the residual quantity of trimethylaluminum. The ratio of the molar quantity of the aluminum atoms contained in the trimethylaluminum to the oxygen atoms of the oxygen-containing organic compound (Al/O molar ratio) can be set anywhere within a range of 0.5 to 3.0:1. From the perspectives of ease of preparation of the solution polymethylaluminoxane composition, its stability, and suitably controlling the quantity of residual trimethylaluminum, the ratio of the molar quantities desirably falls within a range of 1.0 to 1.7:1, preferably within a range of 1.15-1.3:1.

The thermal decomposition of the aluminum compound containing aluminum-oxygen-carbon bonds that is a precursor of the solution polymethylaluminoxane composition can be conducted at any temperature from 20 to 120° C. From the perspectives of ease of handling the reaction, stability, and a suitably reaction time, 30 to 80° C. is desirable and 60 to 80° C. is preferred. The period of thermal decomposition of the aluminum compound having aluminum-oxygen-carbon bonds will vary with the thermal decomposition temperature and composition of the starting material (such as the Al/O molar ratio and concentration). By way of example, this period will fall within a range of 5 to 100 hours. The lower the temperature, the longer the period required. The higher the temperature, the shorter the period within which thermal decomposition can be completed.

When the thermal decomposition temperature exceeds 100° C., in some cases, an amorphous gel product is easily generated in pronounced fashion, decreasing the recovery yield of uniform polymethylaluminoxane solution. Conversely, when the thermal decomposition temperature drops below 50° C., the increased period of the polymethylaluminoxane producing reaction sometimes causes a drop in productivity.

Temperature control is important when preparing the solution polymethylaluminoxane composition used as a raw material in the present invention. At first glance, it is highly probable that part of the present invention is considered to be included in the process of preparing a solution polymethylaluminoxane composition. However, when the object is to obtain a solid MAO composition with a controlled particle size, it is desirable to first prepare a solution polymethylaluminoxane composition by thermal decomposition of an alkylaluminum compound having aluminum-oxygen-carbon bonds as the raw material of the solution polymethylaluminoxane composition, before then obtaining a solid methylaluminoxane composition. That is, in this method an alkylaluminum compound having aluminum-oxygen-carbon bonds is thermally decomposed to prepare a solution polymethylaluminoxane composition, and the prepared solution polymethylaluminoxane composition is then heated under specific conditions to obtain a solid methylaluminoxane composition. Once the solution polymethylaluminoxane composition has been prepared, the parameters of stirring, concentration and heating temperature can be used to obtain a solid methylaluminoxane composition with a controlled particle size. The reasons for this are not presently clear, but considering that polymethylaluminoxane having a certain chain length and chain length distribution forms a solid methylaluminoxane composition having an energetically stable particle size by self-association under heat treatment, the inventors believe that it is clearly necessary to have proper polymethylaluminoxane structures already formed.

The polymethylaluminoxane concentration of an inert hydrocarbon solvent solution prepared by thermal decomposition of an alkylaluminum compound having aluminum-oxygen-carbon bonds as a raw material of the solution polymethylaluminoxane composition is preferably in the range of 1 to 40 wt %, or more preferably 6 to 30 wt %, or still more preferably 8 to 15 wt %. The lower the polymethylaluminoxane concentration, the more time is required, while if the concentration is high, thermal decomposition can be completed more rapidly. The reaction heat control situation can be considered when adjusting the concentration.

In nearly all the literature to-date on obtaining solution polymethylaluminoxane compositions by the thermal decomposition reaction of an aluminum compound having aluminum-oxygen-carbon bonds, it is emphasized that the solution polymethylaluminoxane composition is obtained at a quantitative reaction yield and that the quantity of trimethylaluminum in the solution polymethylaluminoxane composition can be controlled. Generally, trimethylaluminum does not have an effect as an activating agent on transition metal compounds, including metallocenes, so controlling the quantity of trimethylaluminum remaining in the solution polymethylaluminoxane composition is an important problem. However, when preparing a solution polymethylaluminoxane composition by hydrolysis, it is known that unless the concentration of aluminum in the reaction solution is lowered and the quantity of water added to the starting material trimethylaluminum is kept down, the aluminum recovery rate will drop precipitously.

In the solution polymethylaluminoxane composition used as a raw material, the mole fraction of methyl groups derived from trimethylaluminum segments relative to the total molar number of methyl groups (Me(TAL)) is preferably not more than 15 mol % from the standpoint of improving the yield of solid polymethylaluminoxane. The Me(TAL) is more preferably not more than 14 mol %. The lower limit of the Me(TAL) is about 6 mol %. The Me(TAL) of a solution polymethylaluminoxane composition prepared by a hydrolysis method is 40 to 50 mol %, and it is difficult to lower the Me(TAL) of a polymethylaluminoxane composition below 15 mol % by ordinary concentration to dryness. On the other hand, when a solution polymethylaluminoxane composition is prepared by thermal decomposition, the lower limit of the Me(TAL) can be 8 mol % if the molar ratio of aluminum atoms contained in trimethylaluminum to oxygen atoms in oxygen-containing organic compounds is 1.15, and the resulting solid MAO composition has favorable performance. For these reasons, the Me(TAL) is preferably 8 mol % to 14 mol %.

The solution polymethylaluminoxane used in the present invention may also be obtained by adding the aliphatic or aromatic carboxylic acid, represented by general formula (III), in several additions:

$$R^1-(COOH)_n \quad (III)$$

In the formula, $R^1$ is a $C_{1-20}$ linear or branched alkyl, alkenyl or aryl hydrocarbon group, and n is an integer from 1 to 5.

That is, it is also possible to use a solution polymethylaluminoxane obtained by further adding the aliphatic or aromatic carboxylic acid represented by general formula (III) and heat treating the mixture with the aim of adjusting the molecular weight and trimethylaluminum content of the already-formed solution polymethylaluminoxane.

The aromatic hydrocarbon used in the method of manufacturing a solid MAO of the present invention is not particularly limited, and examples include benzene, toluene, ethylbenzene, propylbenzene, butylbenzene, xylene, chlorobenzene, dichlorobenzene and mixed solvents of these and the like. To form the solid polymethylaluminoxane after preparing the solution polymethylaluminoxane, the solution may be heat treated in the solvent as is, or diluted by adding another solvent before heat treatment.

In the step (a) above, a solid MAO composition containing polymethylaluminoxane and trimethylaluminum is precipitated. Next, a solution containing the precipitated solid MAO composition is heated at the same temperature or at a different temperature from step (a) to thereby precipitate $Al_2O_3$ in the solid MAO composition. The solid MAO composition obtained in step (a) corresponds to the solid MAO compositions described in PTL 1 and 2. In these solid MAO compositions, the precipitation rate of the solid MAO composition (rate at which the Al component of the solution polymethylaluminoxane composition is converted to the solid MAO composition) does not reach 100%, and is in the range of 95% to 98% for example. However, $Al_2O_3$ cannot be precipitated by heating under conditions in which the precipitation rate is less than 100%. In the step (b) of the present invention, the precipitation rate of the solid MAO composition reaches 100%, and $Al_2O_3$ is precipitated by heating the solid MAO composition with a precipitation rate of 100%. The precipitation rate of the solid MAO composition can be determined by the following methods.

The precipitation rate of the solid MAO composition is defined as (1-L)×100/K (%) based on the ratio of the Al concentration (L wt %-Al) in the supernatant during precipitation of the solid MAO composition to the Al concentration (K wt %-Al) in the solution polymethylaluminoxane composition. Consequently, the precipitation rate is 0% if there is no change in the Al concentration of the supernatant during heating, and 100% if the Al concentration of the supernatant is 0 wt % after heating.

The heating temperature and heating time for precipitating $Al_2O_3$ in the solid MAO composition after the precipitation of the solid MAO composition will change depending on precipitation temperature and the time it takes to complete the precipitation of the solid MAO composition in the step (a) and the precipitated particle size of the solid MAO composition in step (a) and the solution polymethylaluminoxane composition used. However, in general the temperature is the same as or different from the temperature in step (a), and is in the range of 80° C. to 200° C., or preferably 90° C. to 150° C., or more preferably 100° C. to 140° C. At this temperature range, the heating time is preferably 1 to 20 hours, or more preferably 5 to 12 hours. However, at lower temperatures it takes more time for $Al_2O_3$ to form in the solid MAO composition, while at higher temperatures it tends to take less time for $Al_2O_3$ to form in the solid MAO composition.

It is technically difficult to directly measure the content of $Al_2O_3$ having a crystal structure and $Al_2O_3$ having an amorphous structure in the solid MAO composition. It can however be determined indirectly by measuring the amount of methane gas generated during heat treatment during and after formation of the solid MAO composition. This is because the formation of $Al_2O_3$ structures according to the following formula (X) is presumed. The specific methods are explained in the examples.

Formula (X)

It is difficult to directly monitor $Al_2O_3$ formation in the solid MAO composition. Therefore, measurement of methane gas generated by heating can be used as an indirect method for monitoring $Al_2O_3$ formation. As $Al_2O_3$ is formed, methane gas (Me-H) is generated as shown by formula (X) above. If the precipitation rate of the solid MAO composition (rate at which the Al component of the solution polymethylaluminoxane composition is converted to the solid MAO composition) is 100%, the amount of $Al_2O_3$ formation can be determined by the following method from the amount of methane gas generated. When the precipitation rate is 100%, if x1 as the amount of methane gas generated per molar amount of Al from the solution polymethylaluminoxane composition, x1 can be determined by measuring the amount of methane gas at the point at which the precipitation rate reaches 100%. Furthermore, once the precipitation rate has reached 100%, if x2 is the amount of methane gas generated per molar amount of Al from the solid MAO composition, the total amount of generated methane gas x (=x1+x2) can be measured and x2 can be determined as a difference (x−x1).

Once $Al_2O_3$ has been formed in the solid MAO composition by heating for a specific time, the solid MAO composition of the present invention containing $Al_2O_3$ can be obtained by collecting the solid component from the solvent. The resulting solid MAO composition of the present invention can also be washed and dried as appropriate.

[Olefin Polymerization Catalyst]

The present invention also encompasses an olefin polymerization catalyst. The olefin polymerization catalyst of the present invention contains the solid MAO composition of the present invention and a transition metal compound represented by general formula (IV) below as a catalytic component:

$$MR^5R^6R^7R^8 \quad (IV)$$

wherein M denotes a transition metal element; $R^5$ and $R^6$ denote together an organic group comprising a cycloalkanedienyl skeleton, $R^7$, and $R^8$ denote together an organic group comprising a cycloalkanedienyl skeleton, or $R^7$ and $R^8$ independently denotes an organic group or atom selected from the group consisting of a hydrocarbon group with 1 to 20 carbon atoms, alkoxy group, aryloxy group, alkylsilyl group, amino group, imino group, hydrogen atom, and halogen atom; and the organic group comprising a cycloalkanedienyl skeleton may have alkyl group, alkoxy group, aryloxy group, alkylsilyl group, alkylamide group, alkylimide group, alkylamino group, alkylimino group, and/or halogen atom.

The solid MAO composition of the present invention may be used as a polymerization catalyst in combination with a catalyst that is known as an olefin polymerization catalyst. Examples of olefin polymerization catalysts include transition metal compounds. Such a transition metal compound may be one represented by general formula (IV) above.

Specific examples of M in general formula (IV) are: titanium, zirconium, hafnium, chromium, vanadium, manganese, iron, cobalt, nickel, and palladium. Titanium, zirconium, chromium, iron, and nickel are desirable.

Metallocene compounds in which 1 or 2 ligands having cycloalkadienyl skeletons are coordinated in general formula (IV) are desirable as transition metal compounds. Examples of ligands having cycloalkadienyl skeletons are cyclopentadienyl groups, methylcyclopentadienyl groups, ethylcyclopentadienyl groups, butylcyclopentadienyl groups, dimethylcyclopentadienyl groups, pentamethylcyclopentadienyl groups, other alkyl-substituted cyclopentadienyl groups, indenyl groups, and fluorenyl groups. The cycloalkadienyl groups can be crosslinked with divalent substituted alkylene groups, substituted silylene groups, and the like.

Examples of ligands other than ligands having cycloalkadienyl skeletons are hydrocarbon groups with 1 to 20 carbon atoms, alkoxy groups, aryloxy groups, alkylsilyl groups, amino groups, imino groups, halogen atoms, and hydrogen atoms. Examples of hydrocarbons having 1 to 20 carbon atoms are alkyl groups, cycloalkyl groups, aryl groups, and aralkyl groups. Specific examples of alkyl groups are methyl groups, ethyl groups, propyl groups, isopropyl groups, and butyl groups. Specific examples of cycloalkyl groups are cyclopentyl groups and cyclohexyl groups. Specific examples of aryl groups are phenyl groups and tolyl groups. Specific examples of aralkyl groups are benzyl groups. Specific examples of alkoxy groups are methoxy groups, ethoxy groups, and butoxy groups. Specific examples of aryloxy groups are phenoxy groups. These groups can also be substituted with halogen atoms and the like. Specific examples of alkylsilyl groups are trimethylsilyl groups and triethylsilyl groups. Specific examples of halogens are fluorine, chlorine, bromine, and iodine.

Specific examples of transition metal compounds containing a ligand having a cycloalkanedienyl skeleton when M in general formula (IV) is zirconium are: bis(cyclopentadienyl)zirconium monochloride monohydride, bis(cyclopentadienyl)zirconium monobromide monohydride, bis(cyclopentadienyl)methylzirconium hydride, bis(cyclopentadienyl)ethylzirconium hydride, bis(cyclopentadienyl)phenylzirconium hydride, bis(cyclopentadienyl)benzylzirconium hydride, bis(cyclopentadienyl)neopentylzirconium hydride, bis(methylcyclopentadienyl)zirconium monochloride hydride, bis(indenyl)zirconium monochloride hydride, bis(cyclopentadienyl)zirconium dichloride, bis(cyclopentadienyl)zirconium dibromide, bis(cyclopentadienyl)methylzirconium monochloride, bis(cyclopentadienyl)ethylzirconium monochloride, bis(cyclopentadienyl)cyclohexylzirconium monochloride, bis(cyclopentadienyl)phenylzirconium monochloride, bis(cyclopentadienyl)benzylzirconium monochloride, bis(methylcyclopentadienyl)zirconium dichloride, bis(dimethylcyclopentadienyl)zirconium dichloride, bis(n-butylcyclopentadienyl)zirconium dichloride, bis(indenyl)zirconium dichloride, bis(indenyl)zirconium dibromide, bis(cyclopentadienyl)zirconium dimethyl, bis(cyclopentadienyl)zirconium diphenyl, bis(cyclopentadienyl)zirconium dibenzyl, bis(cyclopentadienyl)zirconium monomethoxymonochloride, bis(cyclopentadienyl)zirconium monoethoxymonochloride, bis(methylcyclopentadienyl)zirconium monoethoxymonochloride, bis(cyclopentadienyl)zirconium monophenoxymonochloride, and bis(fluorenyl)zirconium dichloride.

Specific examples of transition metal compounds in which M in general formula (IV) denotes zirconium, that contain at least two ligands having cycloalkadienyl skeletons, and in which the at least two ligands having cycloalkadienyl skeletons are bonded through ethylenes, propylenes, other alkylene groups, isopropylidenes, diphenylmethylenes, other substituted alkylene groups, silylene groups, dimethylsilylenes, or other substituted silylene groups are: ethylene bis(indenyl)dimethylzirconium, ethylene bis(indenyl)diethylzirconium, ethylene bis(indenyl)diphenylzirconium, ethylene bis(indenyl)methylzirconium monochloride, ethylene bis(indenyl)ethylzirconium monochloride, ethylene bis(indenyl)methylzirconium monobromide, ethylene bis(indenyl)zirconium dichloride, ethylene bis(indenyl)zirconium bromide, and ethylene bis(4,5,6-tetrahydro-1-indenyl)zirconium dichloride. These can be in racemic form, meso form, or combinations thereof.

In homogeneous polymerization, one of these transition metal compounds can be employed alone, or two or more can be employed to adjust the molecular weight distribution or the like. When a solid catalyst is prepared in advance, one of these transition metal compounds can be employed alone or two or more can be employed to adjust the molecular weight distribution or the like.

[Method for Producing Polyolefins]

The present invention includes a method for producing polyolefins comprising polymerizing an olefin with the catalyst of the present invention.

In homogeneous system polymerization employing the solid MAO composition of the present invention and in polymerization employing a supported catalyst prepared with the solid MAO composition of the present invention, suitable performance is achieved in methods where the form of polymerization is solution polymerization or slurry polymerization employing a solvent, bulk polymerization not employing a solvent, gas phase polymerization, and the like. Good performance is also achieved in both continuous polymerization and batch polymerization methods. The use of hydrogen or the like as a molecular weight-regulating agent is also possible as needed. The conditions of olefin polymerization can be chosen in view of the polymerization method.

The monomer employed in polymerization can be a single olefin monomer or compounds that can be employed in copolymerization combining such monomers. Specific examples are ethylene, propylene, 1-butene, 1-pentene, 1-hexene, 1-decene, 1-hexadecene, 1-octadecene, 1-eicosene, other α-olefins, bisfluoroethylene, trifluoroethylene, tetrafluoroethylene, hexafluoropropylene, other halogen-substituted olefins, cyclopentene, cyclohexene, norbornene, and other cyclic olefins.

EXAMPLES

The present invention is described in detail below through Examples. However, the present invention is not limited to the Examples.

In the Examples set forth below, the solid methylaluminoxane composition was normally dried at 40° C. through a sealed pot charged with fluid paraffin under a full vacuum generated with a vacuum pump. Drying was terminated at the point where no air bubbles were observed within the sealed pot.

[Test Methods]

(1) Solubility

The rate at which the solid methylaluminoxane composition of the present invention dissolves in toluene and n-hexane maintained at 25° C. was measured in accordance with the methods described in Japanese Examined Patent Publication No. H07-42301. Specifically, the dissolution rate in n-hexane is determined by adding 2 g of the solid MAO composition to 50 ml of n-hexane maintained at 25° C., stirring for 2 hours, and then separating the solution part with a membrane filter and measuring the aluminum concentration of this filtrate. The dissolution rate by this method is determined as the ratio of aluminum atoms contained in the filtrate to the amount of aluminum atoms corresponding to 2 g of the solid MAO composition used as the sample.

(2) Aluminum Content

The aluminum content of the solution polymethylaluminoxane composition and the solid support-polymethylaluminoxane complex was basically measured by adding an excess quantity of disodium ethylenediamine tetraacetate to a solution that had been hydrolyzed with a 0.5N sulfuric acid aqueous solution, employing dithizone as an indicator, and performing a back titration with zinc sulfate. When the concentration being measured was weak, measurement was conducted by atomic absorption spectrometry.

(3) The Specific Surface Area of the Solid MAO Composition

The specific surface area of the solid MAO composition was determined from the BET adsorption isotherm using the phenomenon of gas adsorption on a solid surface. A BEL-SORP-mini II manufactured by BEL Japan, Inc. was used as the measurement equipment, with nitrogen gas as the measurement gas.

(4) Volume-Based Median Diameter and Particle Size Distribution of Solid MAO Composition The volume-based median diameter and particle size distribution of solid MAO composition were determined by the laser diffraction and scattering method under a dry nitrogen atmosphere with a Mastersizer 2000 Hydro S made by Malvern Instrument Ltd. Primarily dehydrated and degassed n-hexane was employed as the dispersion medium, with dehydrated and degassed toluene being employed on some occasions depending on the objective. Homogeneity as defined by the following equation was employed as an indicator of catalyst particle size distribution:

$$\text{Homogeneity} = \Sigma Xi|d(0.5) - Di|/d(0.5)\Sigma Xi$$

Here, Xi denotes the histogram value of a particle i, d(0.5) denotes the volume-based median diameter, and Di denotes the volume-based diameter of a particle i.

(5) Mole Fraction of Methyl Groups

The mole fractions of the various components in the polymethylaluminoxane composition were determined from the area ratios assigned to the various components in $^1$H-NMR measurement of the polymethylaluminoxane composition. An example of the methods of determining the specific Me(PMAO) and Me (TMAL) mole fractions of the polymethylaluminoxane composition are given below. The mole fraction of methyl groups contributed from polymethylaluminoxane is denoted as Me(PMAO). The mole fraction of methyl groups contributed from trimethylaluminium is denoted by Me (TMAL).

Figure 1:
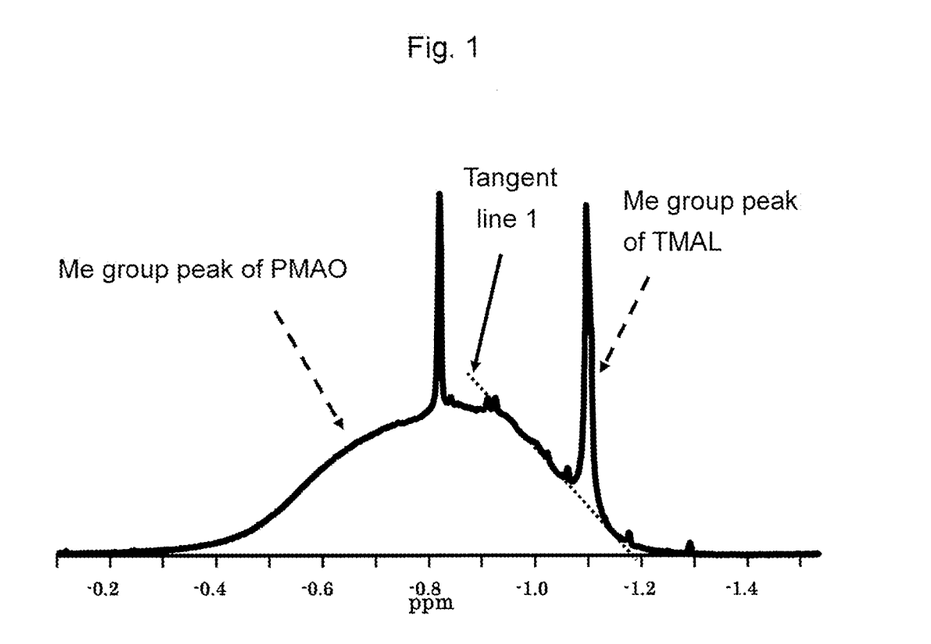
FIG. 1 shows the results of $^1$H-NMR measurement of a solid MAO composition.
Figure 2:
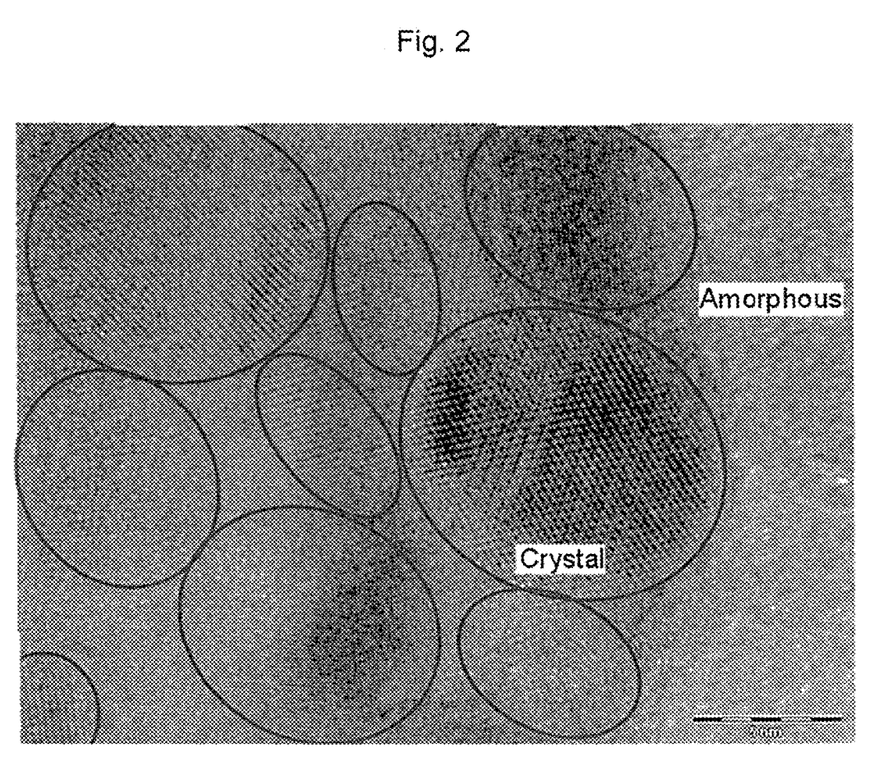
FIG. 2 is a TEM measurement image (Example 2) of a solid MAO composition.

First, $^1$H-NMR measurement of the polymethylaluminoxane composition was conducted with $d_8$-THF as a deuterated solvent. The $^1$H-NMR measurement was conducted at a measurement temperature of 24° C. with a Gemini 2000 300 MHz NMR measurement apparatus from Varian Technologies Japan, Ltd. An example of a $^1$H-NMR chart is given in FIG. 1.

(i) The full integral value of the peak of Me groups of polymethylaluminoxane including trimethylaluminoxane, which appeared at from about −0.3 ppm to −1.2 ppm, was determined and adopted as I (polymethylaluminoxane).

(ii) The peak of Me groups contributed from TMAL in the vicinity of −1.1 ppm was cut by tangent-1, and the integral value I (TMAL-Me) was determined.

(iii) Each of the integral value determined in (ii) was subtracted from integral value I (polymethylaluminoxane) determined in (I) to determine the Me-group integral value I (PMAO-Me) of just the polymethylaluminoxane without the trimethylaluminum. I (TMAL-Me) and I (PMAO-Me) were normalized by division by I (polymethylaluminoxane) to determine the mole fractions of Me(PMAO) and Me (TMAL).

The various peaks can be conveniently cut out by methods employing commercially available curve fitting programs and by methods employing baseline collection.

Further, the analysis sample of the solution polymethylaluminoxane composition was prepared by adding about 0.5 mL of $d_8$-THF to about 0.05 mL of solution polymethylaluminoxane composition. The analysis sample of solid MAO composition was prepared by adding 0.5 mL of $d_8$-THF to 10 mg of solution polymethylaluminoxane composition.

(6) TEM Observation of Solid MAO Composition

A toluene slurry of the solid MAO composition was pulverized with a wet bead mill apparatus (Ashizawa Finetech Ltd. LMZ015, beads: zirconia Φ0.1 mm). The pulverized particles were then dried under reduced pressure. Those of the pulverized fine particles with a sample thickness of 80 nm or less were collected, and subjected to TEM observation with a JEM-2010 TEM measurement apparatus from JEOL Ltd.

It was confirmed by the following method that the structure of the lattice pattern confirmed in the TEM image of the solid MAO composition was attributable to the alumina structure.

Figure 3:
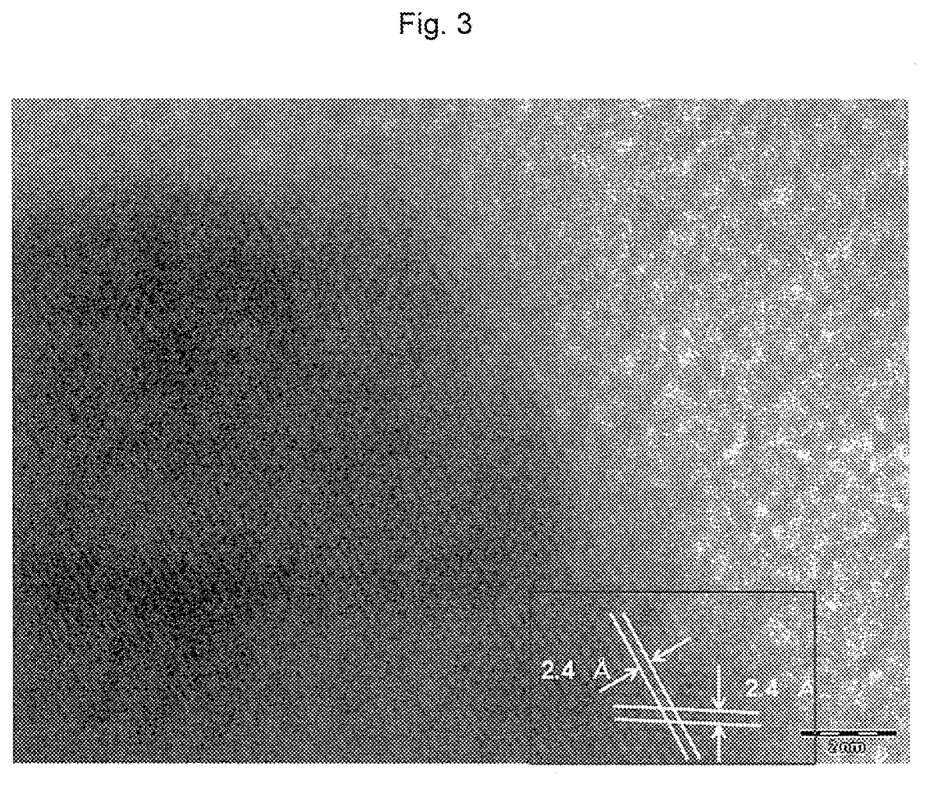
FIG. 3 is a TEM image. The interstitial distance and plane orientation were determined from the crystal pattern of the part surrounded by a red rectangle in the image (d value 2.4 Å).

1) The interstitial distance and plane orientation were determined from the crystal pattern of the part surrounded by a rectangle in the TEM image shown in FIG. 3. The d value was 2.4 Å.

Figure 4:
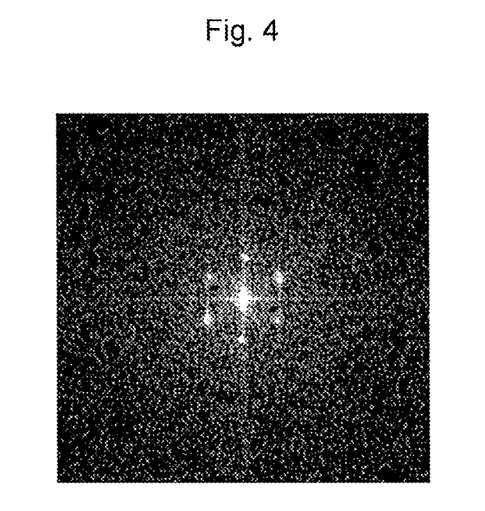
FIG. 4 is an electron diffraction pattern (ED pattern).

2) The electron diffraction pattern (ED pattern) shown in FIG. 4 was determined by Fourier transform from the parameters determined above, using ReciPro software.

Figure 5:
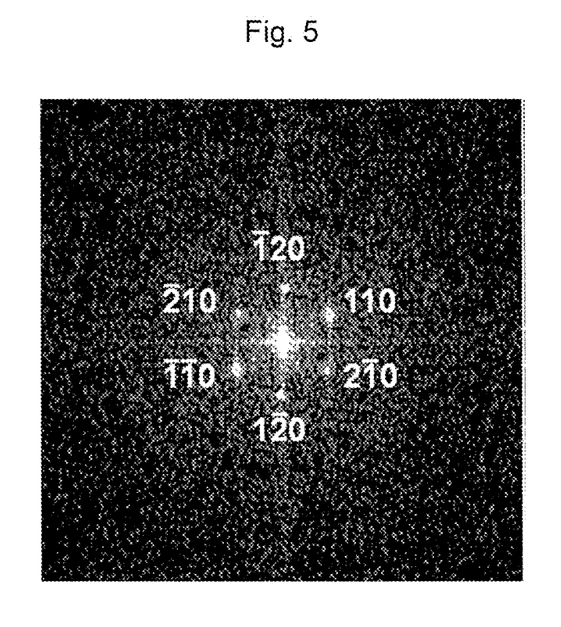
FIG. 5 shows the ED pattern of alumina having a corundum structure.

3) Out of the alumina crystal structures, the ED pattern of alumina having a corundum pattern was determined with the ReciPro software using the following parameters. FIG. 5 shows an ED pattern having the following parameters.

Figure 6:
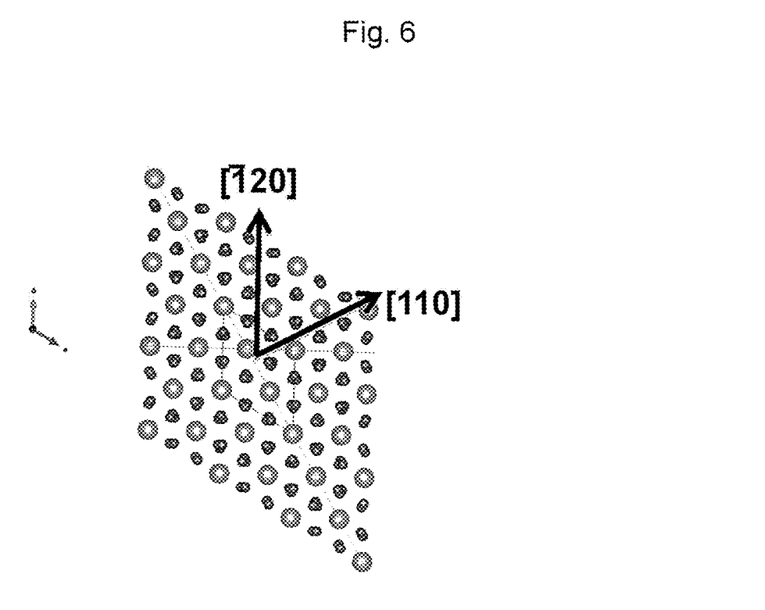
FIG. 6 shows a crystal structure determined using VESTA software from the ED pattern of alumina having a corundum structure.

Unit-cell parameter of $Al_2O_3$ [Acta Crystallographica A38 (1982) 733]:
a=b=4.7602 Å, c=12.9933 Å
$\alpha=\beta=90°$, $\gamma=120°$ The crystal structure was determined with VESTA software from the ED pattern of alumina having a corundum structure determined in 1), as shown in FIG. 6.

This was compared with the ED pattern of the solid MAO composition determined in 2), to confirm that the two were the same. Comparing FIG. 6 with the lattice pattern (surrounded part in FIG. 3) of the solid polymethyaluminoxane, the two were confirmed to be a favorable match.

3) It was concluded that the crystal part obtained from the TEM image of the solid MAO composition is alumina having a corundum structure.

4) From these researches, it was concluded that the crystal part confirmed in the solid MAO composition is alumina having a corundum structure.

(7) Estimating Methane Gas Production During Preparation of Solid MAO Composition 262 g of the solution polymethylaluminoxane composition was introduced into a 1270 ml autoclave equipped with a stirrer and a pressure gauge capable of digital measurement, and the temperature was raised to form a solid MAO composition. After a specific heating time the temperature was lowered to 80° C., and the pressure was measured at that point. The amount of methane gas present in the space volume can be estimated after considering the thermal expansion of the slurry solution in the autoclave, the solvent vapor pressure and the partial pressure of the $N_2$ present when the solution polymethylaluminoxane composition was introduced.

Since methane gas comes from dissociation of Me groups bound to Al atoms present in the solution polymethylaluminoxane composition, it is believed the Al atoms from which the Me groups have dissociated are directly linked to $Al_2O_3$ formation. This in turn corresponds to the maximum values of the crystalline and amorphous $Al_2O_3$. Consequently, the amount (mol %) of $Al_2O_3$ generated as a percentage of the molar amount of Al in the solution polymethylaluminoxane is half the amount (A: mol %) of methane gas generated as a percentage of the molar amount of Al in the solution polymethylaluminoxane, or A/2 (mol %).

The following reactions were conducted in a dry nitrogen gas atmosphere. All solvents employed had been dehydrated and degassed.

Preliminary Test 1 (Benzoic Acid-Al/O=1.17)

(1) Synthesis of Solution Polymethylaluminoxane Composition

To a separable flask with an internal volume of 2 L equipped with a stirring apparatus were charged 240.8 g (3.34 mol) of trimethylaluminum (TMAL) and 680.5 g of toluene. The solution was cooled to 15° C. and 176.6 g (1.43 mol) of benzoic acid was gradually added at a rate such that the temperature of the solution remained at 25° C. or lower. Subsequently, heating and aging were conducted for 1 hour at 50° C. At that time, the molar ratio of TMAL to oxygen atoms in the benzoic acid was 1.17. The reaction solution was heated for 32 hours at 70° C. and then heated to 60° C. for 6 hours to obtain a toluene solution of polymethylaluminoxane composition. The solution obtained was a transparent, gel-free liquid. The results of aluminum analysis conducted after recovery of the reaction solution revealed a quantitative reaction yield based on aluminum atoms. The concentration of aluminum in the reaction solution obtained was 8.67 wt %. The quantity of Me (TMAL) in the solution polymethylaluminoxane composition obtained as determined by $^1$H-NMR was 13.1 mol %.

(2) Ethylene Polymerization Evaluation

Polymerization with Bis(Cyclopentadienyl)Zirconium Dichloride

To a 500 mL, four-necked flask equipped with magnetic stirring apparatus was charged 250 mL of toluene and the flask was heated to 34° C. To this was added, based on aluminum atoms, 0.16 g (5.93 mmol) of polymethylaluminoxane toluene solution, to which bis(cyclopentadienyl) zirconium dichloride ($Cp_2ZrCl_2$) was added to achieve an Al/Zr molar ratio of 5,000. While heating the mixture to 40° C., ethylene gas was blown in. Ten minutes later, the supply of ethylene gas was halted and methanol was introduced to deactivate the catalyst. The polyethylene produced was filtered out and dried. The polymerization activity was determined to be $48\times10^6$ g-PE/mol-Zr·atm·hr. The molecular weight measured with a high temperature GPC was 180,000 and Mw/Mn was 2.9. The polymer was amorphous in shape, and there was pronounced fouling of the polymerization apparatus.

Example 1

(1) Synthesis of Solid-Form MAO Composition (Hereinafter Referred to as a "Solid MAO Composition")

258.6 g (0.831 mol Al) of a toluene solution of the solution polymethylaluminoxane composition prepared in Preliminary Test 1 (Al/O=1.17) was introduced into a 1 L autoclave equipped with a stirring apparatus. This was then heated for 8 hours at 120° C. with stirring at 300 rpm. A solid MAO composition was precipitated during heating.

The reaction slurry was collected, the supernatant was removed from the solid MAO composition by decantation, and a washing operation was performed by decantation four times with 200 ml of toluene. Part of the resulting solid MAO slurry was collected, and dried under reduced pressure at 40° C. to obtain a dry solid MAO composition. The precipitation rate of the dry solid MAO composition was 100% based on the aluminum atoms in the solution polymethylaluminoxane composition used. The slurry concentration of the toluene slurry of the solid MAO composition as determined from the weight of the dry solid MAO composition was determined to be 9.16 wt % solid MAO.

(2) Analysis of the Solid MAO Composition (a) Aluminum Content

The aluminum content of the dry solid MAO composition was measured and determined to be 41.0 wt % Al.

(b) Shape Evaluation

The particle size distribution of the dry solid MAO composition was evaluated with a Master Sizer 2000 Hydro S. The volume-based medium diameter of a sample of the solid MAO composition when cooling at 50° C. was d(0.5) 6.1 μm, and the uniformity was 0.230.

(c) Volume of Methane Gas Produced

The amount of methane gas produced relative to the amount of Al in the solution polymethylaluminoxane composition was calculated to be 3.4 mol % as determined from the internal pressure (0.16 MPa) when the temperature was lowered to 80° C. after the reaction. Consequently, the maximum rate of $Al_2O_3$ formation relative to the amount of Al in the solution polymethylaluminoxane composition was 1.70 mol %.

(d) Measurement of Specific Surface Area

The specific surface area of the dry solid MAO composition was measured and determined to be 544 $m^2/g$.

(3) Evaluation of Ethylene Polymerization a) Preparation of Bisindenylzirconium Dichloride (BI) Supporting Solid MAO Catalyst 46.8 g of a toluene slurry of the solid MAO composition (a slurry concentration 9.16 wt %-solid MAO composition, 4.29 g (65.9 mmol) as aluminum atoms) was added to a 300 ml 4-necked flask having a magnetic stirrer, and stirred after addition of a further 40 ml of toluene. A toluene slurry of BI was then added at room temperature to an Al/Zr molar ratio of 200, and the mixture was reacted for 15 hours at the same temperature under light shielding to obtain a BI supporting solid MAO catalyst. When this was analyzed by the same methods used to determine the solid MAO toluene slurry concentration, the toluene slurry concentration of the BI supporting solid MAO catalyst was determined to be a 3.29 wt %-BI supporting solid MAO catalyst (34 mg BI supporting solid MAO catalyst/ml).

b) Evaluation of Ethylene Polymerization 800 ml of hexane and 1 ml (0.5 mmol) of a 0.5 mol/L hexane solution of triethylaluminum were added to a 1 L autoclave equipped with a catalyst loading pot, a temperature measurement device and a magnetic stirrer, and ethylene pressurization (0.8 MPa)-degassing was performed twice to substituted ethylene for the $N_2$ inside the autoclave. The solution inside the autoclave was then heated to 75° C., and 11 mg of the BI supporting solid MAO catalyst (0.32 ml as slurry) was added with the loading pot. The inside of the autoclave was then immediately pressurized to 0.8 MPa with ethylene to initiate polymerization. Polymerization was performed for 1 hour, during which time the internal temperature of the autoclave was controlled to 80±1° C. with a heat medium and refrigerant. After the polymerization time was complete, the supply of ethylene gas was stopped, and the autoclave was cooled to 30° C. or less with a refrigerant, after which the gas in the system was released through a vent line. A small amount of a methanol solution of 0.5 wt % BHT (BHT: 2,6-di-t-butylhydroxytoluene) was added, after which the resulting polymer was collected by filtration. The filtered polymer was dried at 50° C. with a vacuum drier, and the polymer activity of this catalyst was determined to be 21.1 kg-PE/g-cat·hr based on the weight (232 g) of the resulting polymer.

c) Evaluation of Obtained Polymer

The resulting polymer had a particle size of 153.4 μm, with a Span of 0.735. The bulk density (BD) was determined to be 0.397 g/cc.

Example 2

(1) Synthesis of Solid MAO Composition

A solid MAO composition was prepared as in Example 1 except that a toluene solution of the solution polymethylaluminoxane composition prepared in Preliminary Test 1 (Al/O=1.17) was heated to 100° C. and the heating time was 16 hours.

The precipitation rate of the dry solid MAO composition was 100.0% based on aluminum atoms in the solution polymethylaluminoxane composition.

(2) Analysis of Solid MAO Composition (a) Aluminum Content

The aluminum content of the dry solid MAO composition was measured and determined to be 40.5 wt % Al.

(b) Shape Evaluation

The particle size distribution of the dry solid MAO composition was evaluated with a Mastersizer 2000 Hydro S. The volume-based median diameter of the solid MAO composition was d(0.5) 7.6 and the uniformity was 0.230.

(c) Volume of Methane Gas Produced

The amount of methane gas produced relative to the amount of Al in the solution polymethylaluminoxane composition was calculated to be 1.8 mol % as determined from the internal pressure (0.13 MPa) when the temperature was lowered to 80° C. after the reaction. Consequently, the maximum rate of $Al_2O_3$ formation relative to the amount of Al in the solution polymethylaluminoxane composition was 0.92 mol %.

(d) Measurement of Specific Surface Area

The specific surface area of the dry solid MAO composition was measured and determined to be 462 $m^2/g$.

(3) Evaluation of Ethylene Polymerization a) Preparation of Bisindenylzirconium Dichloride (BI) Supporting Solid MAO Catalyst BI was supported as in a) of Example 1 (3) to prepare a BI supporting solid MAO catalyst.

b) Evaluation of Ethylene Polymerization

Polymerization was evaluated using the prepared BI supporting solid MAO catalyst as in b) of Example 1 (3). The polymer activity of this catalyst was determined to be 19.6 kg-PE/g-cat·hr based on the resulting dry polymer weight.

c) Evaluation of Obtained Polymer

The resulting polymer had a particle size of 205.3 μm, with a Span of 0.770. The bulk density (BD) was determined to be 0.385 g/cc.

Example 3

(1) Synthesis of Solid MAO Composition

A solid MAO composition was prepared as in Example 1 except that a toluene solution of the solution polymethylaluminoxane composition prepared in Preliminary Test 1 (Al/O=1.17) was heated to 140° C.

The precipitation rate of the dry solid MAO composition was 100.0% based on aluminum atoms in the solution polymethylaluminoxane composition.

(2) Analysis of Solid MAO Composition
(a) Aluminum Content
The aluminum content of the dry solid MAO composition was measured and determined to be 41.4 wt % Al.
(b) Shape Evaluation
The particle size distribution of the dry solid MAO composition was evaluated with a Mastersizer 2000 Hydro S. The volume-based median diameter of the solid MAO composition was d(0.5) 5.2 and the uniformity was 0.220.
(c) Volume of Methane Gas Produced
The amount of methane gas produced relative to the amount of Al in the solution polymethylaluminoxane composition was calculated to be 5.5 mol % as determined from the internal pressure (0.21 MPa) when the temperature was lowered to 80° C. after the reaction. Consequently, the maximum rate of $Al_2O_3$ formation relative to the amount of Al in the solution polymethylaluminoxane composition was 2.75 mol %.
(d) Measurement of Specific Surface Area
The specific surface area of the dry solid MAO composition was measured and determined to be 664 $m^2$/g.
(3) Evaluation of Ethylene Polymerization
a) Preparation of Bisindenylzirconium Dichloride (BI) Supporting Solid MAO Catalyst
BI was supported as in a) of Example 1 (3) to prepare a BI supporting solid MAO catalyst.
b) Evaluation of Ethylene Polymerization
Polymerization was evaluated using the prepared BI supporting solid MAO catalyst as in b) of Example 1 (3). The polymer activity of this catalyst was determined to be 21.8 kg-PE/g-cat·hr based on the resulting dry polymer weight.
c) Evaluation of Obtained Polymer
The resulting polymer had a particle size of 148.2 μm, with a Span of 0.749. The bulk density (BD) was determined to be 0.411 g/cc.

Example 4

(1) Synthesis of Solid MAO Composition
A solid MAO composition was prepared as in Example 1 except that a toluene solution of the solution polymethylaluminoxane composition prepared in Preliminary Test 1 (Al/O=1.17) was heated to 140° C. and the heating time was 16 hours.
The precipitation rate of the dry solid MAO composition was 100.0% based on aluminum atoms in the solution polymethylaluminoxane composition.
(2) Analysis of Solid MAO Composition
(a) Aluminum Content
The aluminum content of the dry solid MAO composition was measured and determined to be 40.9 wt % Al.
(b) Shape Evaluation
The particle size distribution of the dry solid MAO composition was evaluated with a Mastersizer 2000 Hydro S. The volume-based median diameter of the solid MAO composition was d(0.5) 5.0 μm, and the uniformity was 0.225.
(c) Volume of Methane Gas Produced
The amount of methane gas produced relative to the amount of Al in the solution polymetjhylaluminoxane composition was calculated to be 6.9 mol % as determined from the internal pressure (0.24 MPa) when the temperature was lowered to 80° C. after the reaction. Consequently, the maximum rate of $Al_2O_3$ formation relative to the amount of Al in the solution polymethylaluminoxane composition was 3.45 mol %.
(3) Evaluation of Ethylene Polymerization
a) Preparation of Bisindenylzirconium Dichloride (BI) Supporting Solid MAO Catalyst
BI was supported as in a) of Example 1 (3) to prepare a BI supporting solid MAO catalyst.
b) Evaluation of Ethylene Polymerization
Polymerization was evaluated using the prepared BI supporting solid MAO catalyst as in b) of Example 1 (3). The polymer activity of this catalyst was determined to be 24.6 kg-PE/g-cat·hr based on the resulting dry polymer weight.
c) Evaluation of Obtained Polymer
The resulting polymer had a particle size of 155.5 μm, with a Span of 0.730. The bulk density (BD) was determined to be 0.415 g/cc.

Example 5

(1) Synthesis of Solid MAO Composition
A solid MAO composition was prepared as in Example 1 except that a toluene solution of the solution polymethylaluminoxane composition prepared in Preliminary Test 1 (Al/O=1.17) was heated to 160° C.
The precipitation rate of the dry solid MAO composition was 100.0% based on aluminum atoms in the solution polymethylaluminoxane composition.
(2) Analysis of Solid MAO Composition
(a) Aluminum Content
The aluminum content of the dry solid MAO composition was measured and determined to be 41.4 wt % Al.
(b) Shape Evaluation
The particle size distribution of the dry solid MAO composition was evaluated with a Mastersizer 2000 Hydro S. The volume-based median diameter of the solid MAO composition was d(0.5) 5.1 μm, and the uniformity was 0.230.
(c) Volume of Methane Gas Produced
The amount of methane gas produced relative to the amount of Al in the solution polymethylaluminoxane composition was calculated to be 8.02 mol % as determined from the internal pressure (0.26 MPa) when the temperature was lowered to 80° C. after the reaction. Consequently, the maximum rate of $Al_2O_3$ formation relative to the amount of Al in the solution polymethylaluminoxane composition was 4.01 mol %.
(3) Evaluation of Ethylene Polymerization
a) Preparation of Bisindenylzirconium Dichloride (BI) Supporting Solid MAO Catalyst
BI was supported as in a) of Example 1 (3) to prepare a BI supporting solid MAO catalyst.
b) Evaluation of Ethylene Polymerization
Polymerization was evaluated using the prepared BI supporting solid MAO catalyst as in b) of Example 1 (3). The polymer activity of this catalyst was determined to be 27.8 kg-PE/g-cat·hr based on the resulting dry polymer weight.
c) Evaluation of Obtained Polymer
The resulting polymer had a particle size of 161.1 with a Span of 0.752. The bulk density (BD) was determined to be 0.425 g/cc.

Example 6

(1) Synthesis of Solid MAO Composition
A solid MAO composition was prepared as in Example 1 except that a toluene solution of the solution polymethylaluminoxane composition prepared in Preliminary Test 1 (Al/O=1.17) was heated to 160° C. and the heating time was 16 hours.

The precipitation rate of the dry solid MAO composition was 100.0% based on aluminum atoms in the solution polymethylaluminoxane composition.

(2) Analysis of Solid MAO Composition (a) Aluminum Content

The aluminum content of the dry solid MAO composition was measured and determined to be 41.3 wt % Al.

(b) Shape Evaluation

The particle size distribution of the dry solid MAO composition was evaluated with a Mastersizer 2000 Hydro S. The volume-based median diameter of the solid MAO composition was d(0.5) 4.9 μm, and the uniformity was 0.240.

(c) Volume of Methane Gas Produced

The amount of methane gas produced relative to the amount of Al in the solution polymethylaluminoxane composition was calculated to be 10.24 mol % as determined from the internal pressure (0.31 MPa) when the temperature was lowered to 80° C. after the reaction. Consequently, the maximum rate of $Al_2O_3$ formation relative to the amount of Al in the solution polymethylaluminoxane composition was 5.12 mol %.

(3) Evaluation of Ethylene Polymerization a) Preparation of Bisindenylzirconium Dichloride (BI) Supporting Solid MAO Catalyst BI was supported as in a) of Example 1 (3) to prepare a BI supporting solid MAO catalyst.

b) Evaluation of Ethylene Polymerization

Polymerization was evaluated using the prepared BI supporting solid MAO catalyst as in b) of Example 1 (3). The polymer activity of this catalyst was determined to be 36.5 kg-PE/g-cat·hr based on the resulting dry polymer weight.

c) Evaluation of Obtained Polymer

The resulting polymer had a particle size of 178.0 μm, with a Span of 0.716. The bulk density (BD) was determined to be 0.440 g/cc.

Example 7

(1) Synthesis of Solid MAO Composition

A solid MAO composition was prepared as in Example 3 except that a toluene solution of the solution polymethylaluminoxane composition prepared in Preliminary Test 1 (Al/O=1.17) was diluted by addition of toluene to 4.34 wt % in Al content.

The precipitation rate of the dry solid MAO composition was 100.0% based on aluminum atoms in the solution polymethylaluminoxane composition.

(2) Analysis of Solid MAO Composition (a) Aluminum Content

The aluminum content of the dry solid MAO composition was measured and determined to be 40.4 wt % Al.

(b) Shape Evaluation

The particle size distribution of the dry solid MAO composition was evaluated with a Mastersizer 2000 Hydro S. The volume-based median diameter of the solid MAO composition was d(0.5) 32.1 μm, and the uniformity was 0.263.

(c) Volume of Methane Gas Produced

The amount of methane gas produced relative to the amount of Al in the solution polymethylaluminoxane composition was calculated to be 5.65 mol % as determined from the internal pressure (0.15 MPa) when the temperature was lowered to 80° C. after the reaction. Consequently, the maximum rate of $Al_2O_3$ formation relative to the amount of Al in the solution polymethylaluminoxane composition was 2.82 mol %.

(3) Evaluation of Ethylene Polymerization a) Preparation of Bisindenyizirconium Dichloride (BI) Supporting Solid MAO Catalyst BI was supported as in a) of Example 1 (3) to prepare a BI supporting solid MAO catalyst.

b) Evaluation of Ethylene Polymerization

Polymerization was evaluated using the prepared BI supporting solid MAO catalyst as in b) of Example 1 (3). The polymer activity of this catalyst was determined to be 13.8 kg-PE/g-cat·hr based on the resulting dry polymer weight.

c) Evaluation of Obtained Polymer

The resulting polymer had a particle size of 538.0 μm, with a Span of 0.883. The bulk density (BD) was determined to be 0.398 g/cc.

Results of analysis and evaluation of ethylene polymerization on solid MAO compositions of Examples 1 to 7 are listed in Table 1.

Comparative Example 1

A solid MAO composition was prepared as in Example 2 except that the heating time was changed to 8 hours. The precipitation rate of the dry solid MAO composition was 97.0% based on the aluminum atoms in the solution polymethylaluminoxane composition used. The analysis results and ethylene polymerization evaluation results for the solid MAO composition are shown in Table 1.

Reference Example 1

Degassing was performed after Example 3, and the internal pressure was measured at 80° C. and determined to be 0.05 MPa.

TABLE 1

| Example No. | Heating conditions | MAO solution (g) |
|---|---|---|
| Ex 1 | 120° C.-8 hr | 262.1 |
| Ex 2 | 100° C.-16 hr | 262.1 |
| Ex 3 | 140° C.-8 hr | 262.1 |
| Ex 4 | 140° C.-16 hr | 262.1 |
| Ex 5 | 160° C.-8 hr | 262.1 |
| Ex 6 | 160° C.-16 hr | 262.1 |
| Ex 7 | 140° C.-8 hr | 262.1 |
| Comp Ex 1 | 100° C.-8 hr | 262.1 |
| Ref. Ex | 140° C.-8 hr | 262.1 |

| Example No. | $Al_2O_3$ content (mol %) | Precipitation rate (%) | Internal pressure (MPa @ 80° C.) | Solid MAO d (0.5) (μm) | Solid MAO Al (wt %) |
|---|---|---|---|---|---|
| Ex 1 | 1.70 | 100 | 0.16 | 6.1 | 41.0 |
| Ex 2 | 0.92 | 100 | 0.13 | 7.6 | 40.5 |
| Ex 3 | 2.75 | 100 | 0.21 | 5.2 | 41.4 |
| Ex 4 | 3.45 | 100 | 0.24 | 5.0 | 40.9 |
| Ex 5 | 4.01 | 100 | 0.26 | 5.1 | 41.4 |
| Ex 6 | 5.12 | 100 | 0.31 | 4.9 | 41.3 |
| Ex 7 | 2.82 | 100 | 0.15 | 32.1 | 40.4 |
| Comp Ex 1 | 0 | 97 | 0.05 | 8.1 | 40.0 |
| Ref. Ex | — | — | 0.05 | — | — |

| Example No. | Evaluation of polymerization Cat. (mg) | Activity* | BD (g/cc) | Polymer d (0.5) (μm) | Span |
|---|---|---|---|---|---|
| Ex 1 | 11.0 | 21.1 | 0.397 | 153.4 | 0.735 |
| Ex 2 | 11.0 | 19.6 | 0.385 | 205.3 | 0.770 |
| Ex 3 | 11.0 | 21.8 | 0.411 | 148.2 | 0.749 |
| Ex 4 | 11.0 | 24.6 | 0.415 | 155.5 | 0.730 |

TABLE 1-continued

| | | | | | |
|---|---|---|---|---|---|
| Ex 5 | 11.0 | 27.8 | 0.425 | 161.1 | 0.752 |
| Ex 6 | 11.0 | 36.5 | 0.440 | 178.0 | 0.716 |
| Ex 7 | 11.0 | 13.8 | 0.398 | 538.0 | 0.883 |
| Comp Ex 1 | 11.0 | 18.7 | 0.370 | 217 | 0.740 |
| Ref. Ex | — | — | — | — | — |

*kg-PE/g-cat · hr

The invention claimed is:

1. A solid polymethylaluminoxane composition comprising polymethylaluminoxane, trimethylaluminum and $Al_2O_3$, wherein
   (i) the aluminum content is in the range of 36 mass % to 43 mass %, and
   (ii) the $Al_2O_3$ content is in the range of 0.001 mol % to 10 mol % based on aluminum.

2. The solid polymethylaluminoxane composition according to claim 1, wherein at least part of the $Al_2O_3$ exists in the solid polymethylaluminoxane composition in the form of crystal grains.

3. The solid polymethylaluminoxane composition according to claim 2, wherein the crystal grains of the $Al_2O_3$ are in the range of 0.1 to 200 nm in size.

4. The solid polymethylaluminoxane composition according to claim 1, wherein at least part of the $Al_2O_3$ exists in amorphous form in the solid polymethylaluminoxane composition.

5. The solid polymethylaluminoxane composition according to claim 1, wherein the polymethylaluminoxane contains the unit denoted by general formula (I) below:

$$-[(Me)AlO]_n- \qquad (I)$$

wherein, Me represents a methyl group and n denotes an integer from 10 to 50.

6. The solid polymethylaluminoxane composition according to claim 1, wherein Me(TMAL), the mole fraction of methyl groups derived from the trimethylaluminum, is equal to or less than 15 mol %.

7. The solid polymethylaluminoxane composition according to claim 1, which is particulate and has a volume-based median diameter of 1 to 50 μm.

8. The solid polymethylaluminoxane composition according to claim 1, which contains no solid carrier, provided that the $Al_2O_3$ is excluded from the solid carrier.

9. The solid polymethylaluminoxane composition according to claim 1, which is solid state at least at temperatures of 30° C. or less.

10. A method for manufacturing a solid polymethylaluminoxane composition comprising $Al_2O_3$, the method comprising:
    a step (a) of heating an aromatic hydrocarbon solution containing trimethylaluminum and the polymethylaluminoxane containing the unit denoted by general formula (II) below (referred to hereinafter as the solution of polymethylaluminoxane composition) to cause solid polymethylaluminoxane composition containing trimethylaluminum and polymethylaluminoxane to precipitate; and
    a step (b) of heating a solution containing the solid polymethylaluminoxane composition precipitated in step (a) above at the same temperature or at a different temperature from that in step (a) to thereby precipitate $Al_2O_3$ in the solid polymethylaluminoxane composition:

$$-[(Me)AlO]_n- \qquad (II)$$

wherein, n is an integer from 10 to 50.

11. The manufacturing method according to claim 10, wherein a dry inert gas is bubbled through the solution polymethylaluminoxane composition prior to the step (a), and/or a dry inert gas is bubbled through the solution polymethylaluminoxane composition during at least part of the step (a).

12. An olefin polymerization catalyst comprising the solid polymethylaluminoxane composition according to claim 1 and a catalyst component in the form of the transition metal compounds denoted by general formula (IV) below:

$$MR^5R^6R^7R^8 \qquad (IV)$$

wherein M denotes a transition metal element, and one or two of the $R^5$ through $R^8$ organic groups denote a cycloalkanedienyl skeleton, and the remainder of the $R^5$ through $R^8$ organic groups independently denote a hydrocarbon group with 1 to 20 carbon atoms, an alkoxy group, an aryloxy group, an alkylsilyl group, an amino group, an imino group, a hydrogen atom, or a halogen atom; and each organic group comprising a cycloalkanedienyl skeleton may have an alkyl group, an alkoxy group, an aryloxy group, an alkylsilyl group, an alkylamide group, an alkylimide group, an alkylamino group, an alkylimino group, or a halogen atom.

13. A method for manufacturing a polyolefin, comprising polymerizing an olefin in the presence of the catalyst according to claim 12.

* * * * *